United States Patent
Smirnov

(10) Patent No.: US 11,308,484 B2
(45) Date of Patent: Apr. 19, 2022

(54) SYSTEM AND METHOD FOR SECURE STORAGE OF DIGITAL CURRENCIES AND MAKING TRANSACTIONS IN A BLOCKCHAIN NETWORK

(71) Applicant: Aleksey Sergeevich Smirnov, Reutov (RU)

(72) Inventor: Aleksey Sergeevich Smirnov, Reutov (RU)

(*) Notice: Subject to any disclaimer, the term of this patent is extended or adjusted under 35 U.S.C. 154(b) by 0 days.

(21) Appl. No.: 16/975,796

(22) PCT Filed: Feb. 8, 2019

(86) PCT No.: PCT/RU2019/000077
§ 371 (c)(1),
(2) Date: Aug. 26, 2020

(87) PCT Pub. No.: WO2020/162780
PCT Pub. Date: Aug. 13, 2020

(65) Prior Publication Data
US 2021/0383363 A1    Dec. 9, 2021

(51) Int. Cl.
*G06Q 20/36*    (2012.01)
*G06Q 20/02*    (2012.01)
(Continued)

(52) U.S. Cl.
CPC ......... *G06Q 20/3674* (2013.01); *G06Q 20/02* (2013.01); *G06Q 20/389* (2013.01);
(Continued)

(58) Field of Classification Search
CPC .............. G06Q 20/3674; G06Q 20/02; G06Q 20/3825; G06Q 20/3829; G06Q 20/389;
(Continued)

(56) References Cited

U.S. PATENT DOCUMENTS 10,068,228 B1    9/2018    Winklevoss et al.
10,929,842 B1*    2/2021    Arvanaghi ........... G06Q 20/381
(Continued)

FOREIGN PATENT DOCUMENTS

RU    2667801 C1    9/2018

OTHER PUBLICATIONS

Kuppusamy et al., Security: Securing Software Updates for Automotives Using Uptane, www.usenix.org, ;login: Summer 2017, vol. 42, No. 2, pp. 63-67, May 25, 2017 (Year: 2017).*

(Continued)

*Primary Examiner* — James D Nigh

(57) ABSTRACT

The claimed solution relates to a method of making transactions in the blockchain framework using a protected hardware and software complex to ensure secure storage of digital currencies (cryptocurrencies) and control the entire lifecycle of multiple wallets simultaneously to make transactions in the blockchain network. Basic features of the hardware and software complex include the effective control over the entire life cycle of cold wallets, generation of digital wallets and secure storage of their private keys in an isolated environment using the hardware security modules (HSM), as well as maintaining the multiple level authentication of blockchain transactions. It is possible to use all the features of the complex due to compatibility with the application programming interface (API), which enables to integrate the complex into the existing software solutions, for example, banking systems.

15 Claims, 8 Drawing Sheets

Figure 1:
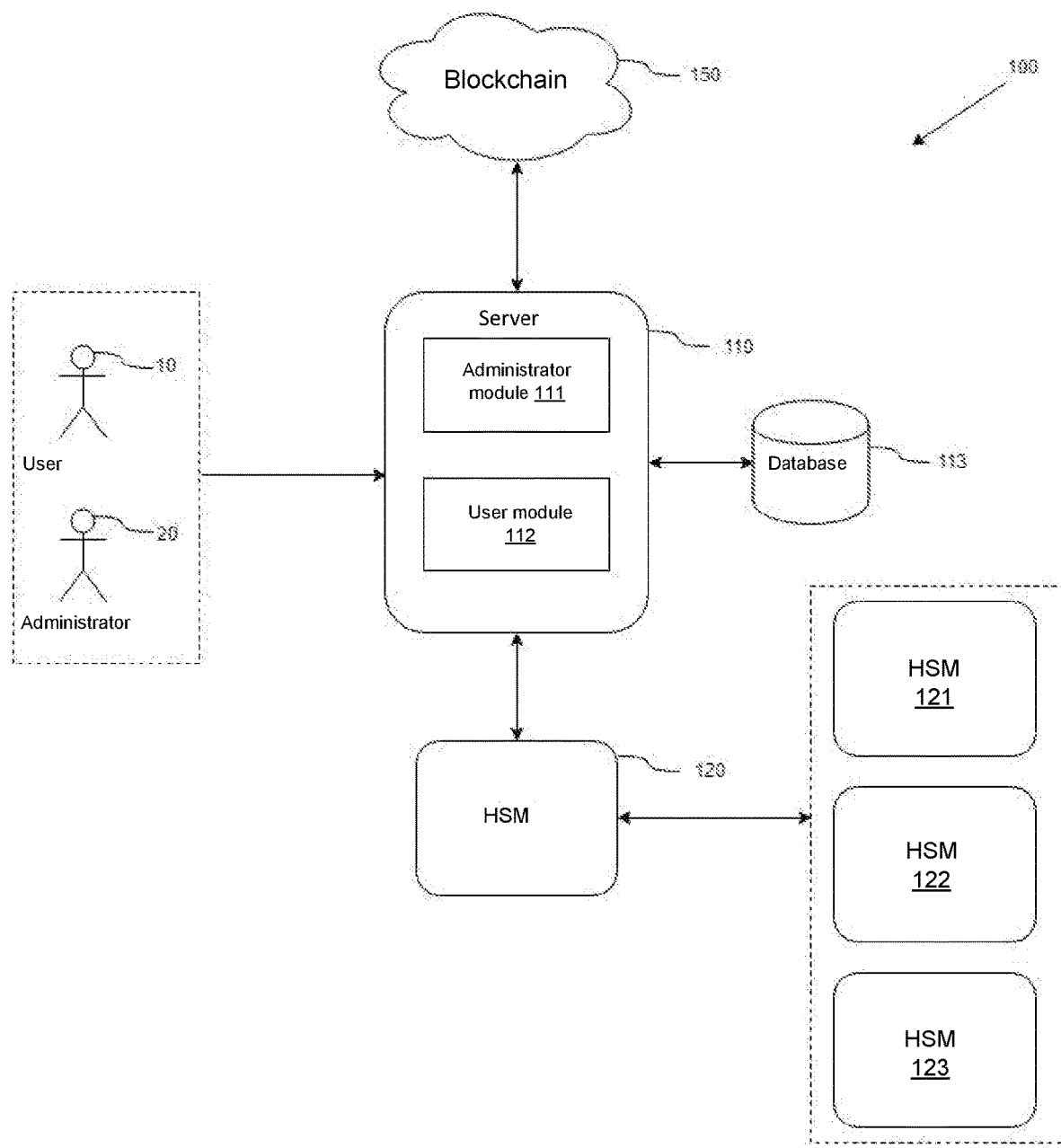

(51) Int. Cl.
    *G06Q 20/38*     (2012.01)
    *G06Q 20/40*     (2012.01)
    *H04L 9/08*     (2006.01)
    *H04L 9/32*     (2006.01)
    *G06Q 20/32*     (2012.01)
    *G06Q 20/06*     (2012.01)
    *G06F 21/74*     (2013.01)

(52) U.S. Cl.
    CPC ..... *G06Q 20/3825* (2013.01); *G06Q 20/3829* (2013.01); *G06Q 20/405* (2013.01); *H04L 9/0894* (2013.01); *H04L 9/3234* (2013.01); *H04L 9/3247* (2013.01); *G06Q 20/3278* (2013.01); *G06Q 20/385* (2013.01); *G06Q 20/40145* (2013.01); *H04L 2209/38* (2013.01); *H04L 2209/56* (2013.01)

(58) Field of Classification Search
    CPC ............. G06Q 20/405; G06Q 20/3278; G06Q 20/385; G06Q 20/40145; H04L 9/0894; H04L 9/3234; H04L 9/3247; H04L 2209/38; H04L 2209/56
    USPC ......................................................... 705/67
    See application file for complete search history.

(56) References Cited

U.S. PATENT DOCUMENTS

| | | |
|---|---|---|
| 2015/0287026 A1 | 10/2015 | Yang |
| 2016/0292672 A1 | 10/2016 | Fay |
| 2017/0048209 A1 | 2/2017 | Lohe |
| 2019/0034920 A1* | 1/2019 | Nolan ................... H04L 9/0822 |
| 2020/0044863 A1* | 2/2020 | Yadlin ................... H04L 9/3247 |
| 2020/0175155 A1* | 6/2020 | Bhamidipati ........... G06F 21/64 |

OTHER PUBLICATIONS

Global Digital Finance Crypto Asset Safekeeping and Custody, Key Considerations and Takeaways [Draft dated Feb. 2, 2019], 19 pages (Year: 2019).*

* cited by examiner

SYSTEM AND METHOD FOR SECURE STORAGE OF DIGITAL CURRENCIES AND MAKING TRANSACTIONS IN A BLOCKCHAIN NETWORK

FIELD OF THE INVENTION

The claimed solution relates to a method of making transactions in the blockchain framework using a protected hardware and software complex to ensure secure storage of digital currencies (cryptocurrencies) and control the entire lifecycle of multiple wallets simultaneously to make transactions in the blockchain network.

BACKGROUND

With the development of the blockchain framework for making transactions in various blockchain networks, it has become an important problem to ensure the secure storage of funds in e-wallets, which are usually a software application and are at risk of software hacking and leakage of confidential data.

An alternative to software wallets are hardware wallets that maintain security of private keys and provide the offline signing of blockchain transactions. However, large investors and organizations providing custody services (banks, funds, etc.), require a brand new approach to storing digital assets, which maintains high security requirements for thousands of blockchain wallets simultaneously. At that, there is a need for centralized and secure lifecycle management of cryptographic keys—their generation, distribution, cold storage and backup. All of these functions must be performed in an isolated environment, protected from any external actions.

To solve this problem, the various solutions are currently proposed that use hardware protection of key information to manage digital wallets and form blockchain transactions. However, there is no solution at the moment that would enable to perform, on a proper security level, the centralized process management to create and manage digital wallets, as well as which would allow for flexible setting of multisignature rules, transaction confirmation rules and their validation in an isolated secure environment.

As an example, such approach was proposed in the solution described in patent application US 20150287026 (Modernity Financial Holdings, Ltd., 08.10.2015), which involves the use of hardware modules for cold storage of backup copies of keys to digital wallets of clients, and the transaction confirmation principle in the form of multisignature was proposed. However, this approach has significant failings in that a multisignature is generated based on a predetermined transaction confirmation procedure from the authorized servers, which must confirm the fact of making transaction, and the use of cold storage is solely for the purpose of storing backup copies of keys to digital wallets, which does not imply the use of these hardware in the course of transactions.

SUMMARY OF THE INVENTION

The present technical solution is focused on elimination of the existing technical problems in this technical field and provides the increased security for simultaneous operation with multiple digital wallets in various blockchain networks and for centralized management of their life cycle, and also offers an integrated hardware and software complex for corporate clients with a high level of protection against unauthorized access to private information and its use for making transactions in the blockchain framework.

Basic features of the hardware and software complex include the effective control over the entire life cycle of cold wallets, generation of digital wallets and secure storage of their private keys in an isolated environment using the hardware security modules (HSM), as well as maintaining the multiple level authentication of blockchain transactions. It is possible to use all the features of the complex due to compatibility with the application programming interface (API), which enables to integrate the complex into the existing software solutions, for example, banking systems.

In the preferred embodiment of the invention, a system is proposed for secure storage of digital currencies, as well as for processing and making transactions in at least one blockchain network, that contains at least a control server connected to at least one blockchain network and providing lifecycle management of users' digital wallets, tracking and validation of incoming transactions, generation and primary validation of transactions in blockchain networks, wherein the server contains an administrator module, which is configured to create accounts and manage administrator rights, create accounts and manage user rights, view statistics on wallets of users;

a user module, which is configured to create digital wallets of users, assign multisignature rules for transactions and rules for their confirmation by users for each created digital wallet;

processing user requests depending on the confirmation rules assigned at creating a digital wallet;

assignment of multi-factor authentication methods by users;

a database, that stores information about addresses of digital wallets, transactions, accounts of administrators and users, their rights and authentication data, multisignature and transaction validation rules;

at least one hardware security module (HSM), which is connected to the control server and provides an isolated environment to create and maintain the full life cycle of digital wallets, secure storage of private keys of digital wallets, storage of the authentication data of administrators and users to support the process of sending addresses of digital wallets to the control server, validation of transactions, signing of the confirmed transactions and their transfer to the control server.

In one specific embodiment of the system, the multisignature rules are set when user's digital wallet is created.

In another specific embodiment of the system, the confirmation rules include at least one of the following: following a hyperlink, entering a code, entering a one-time password, biometric identification, authentication using a hardware token or a cryptographic signature.

In another specific embodiment of the system, multisignature rules include at least one of the following: M of N signatures, signature from K groups of users with quorum within at least L groups.

In another specific embodiment of the system, the hardware token is a smart card, USB, or NFC token.

In another specific embodiment of the system, when processing a transaction for a digital wallet the control server performs its initial verification for compliance with the multisignature and confirmation rules for the above mentioned wallet to approve the transaction.

In another specific embodiment of the system, upon receipt of a request for a transaction via a digital wallet, the control server, using the authentication data, performs the initial verification of signatures of all users assigned in the multisignature rules when a digital wallet was created.

In another specific embodiment of the system, after validation of the transaction creation request, the control server collects primary information about the wallet in the blockchain network and generates a raw transaction on its basis, which is saved in the database.

In another specific embodiment of the system, for each signature the weight coefficients and threshold values are set for each of the groups, and the threshold value must be exceeded by the sum of the weights of all signers in the group to confirm the transaction.

In another specific embodiment of the system, after validation of the transaction and initial verification of all signatures, the control server transmits the transaction data and signatures to the HSM.

In another specific embodiment of the system, by these authentication data the HSM checks the incoming raw transactions from the control server for the validity of the signatures that were used to confirm the transactions, and in case of successful verification it signs the raw transactions using the private key of the digital wallet corresponding to this transaction.

In another specific embodiment of the system, after signing of the raw transaction the HSM transfers the signed transaction to the control server for its subsequent transfer to the blockchain network.

In another preferred embodiment of the presented solution the method is proposed to implement transactions using the digital currencies in the blockchain network, comprising the following steps:
- a request is received on the control server to create a digital wallet to make transactions using digital currencies, in which the transaction multisignature rules and rules for confirmation of transactions by users for the created digital wallet are set, and the multisignature rules include at least the data of users assigned to sign the transaction;
- the rights and signature of the request for creation of a digital wallet are verified by the authentication data;
- the signed request is transferred to the hardware security module (HSM), where the user's digital wallet is created by generating private and public keys;
- the private and public keys of the digital wallet and the authentication data of users assigned to confirm transactions on the created digital wallet are saved in the HSM;
- the public key of the created digital wallet and the authentication data of users assigned to confirm transactions on the created digital wallet are transmitted and saved to the database of the control server;
- a request is received on the control server to execute a transaction by one of the created digital wallets;
- primary data of the digital wallet in the blockchain network are collected on the control server;
- based on the primary data, a raw transaction is generated and the primary transaction is saved on the control server;
- the raw transaction is confirmed by all users using the prescribed transaction multisignature rules and transaction confirmation rules for this digital wallet;
- after checking the confirmation of the transaction by the control server, the raw transaction and signatures of the users who confirmed the transaction are transmitted to the HSM;
- the rules for transaction confirmation by each signer, the conditions for multisignature of the raw transaction are verified on the HSM by the authentication data; in case of successful verification the raw transaction is signed using the private key of the digital wallet whereby the transaction was initiated;
- the signed transaction is transferred to the control server for its further transfer to the blockchain network.

In one specific embodiment of the method, an administrator account with the right to manage administrator accounts is created and saved on the server, and using this administrator account the accounts of administrators and/or users to whom a set of rights is assigned are created.

In another specific embodiment of the method, a user account enables at least one of the following: initiate transactions, approve and reject transactions, veto transactions for a specified period of time after the transaction has been proposed, create digital wallets.

In another specific embodiment of the method, the transaction confirmation rules include at least one of the following: double verification, following a hyperlink, entering a code, entering a one-time password, biometric identification, cryptographic signature, or confirmation using a hardware token.

In another specific embodiment of the method, transaction multisignature rules include at least one of the following: M of N signatures, a signature from multiple groups, or a signature from multiple groups with a quorum within a group, as well as setting a time period for transaction confirmation after which the transaction is rejected.

In another specific embodiment of the method, for each signature the weight coefficients and threshold values are set for each of the groups, and the threshold value must be exceeded by the sum of the weights of all signers in the group to confirm the transaction.

In another specific embodiment of the method, for each initiated transaction a time period is set within which the transaction can be vetoed.

In another specific embodiment of the method, the HSM is implemented with real-time data replication function, which is performed using one or more redundant HSMs.

DRAWINGS

Figure 2A:
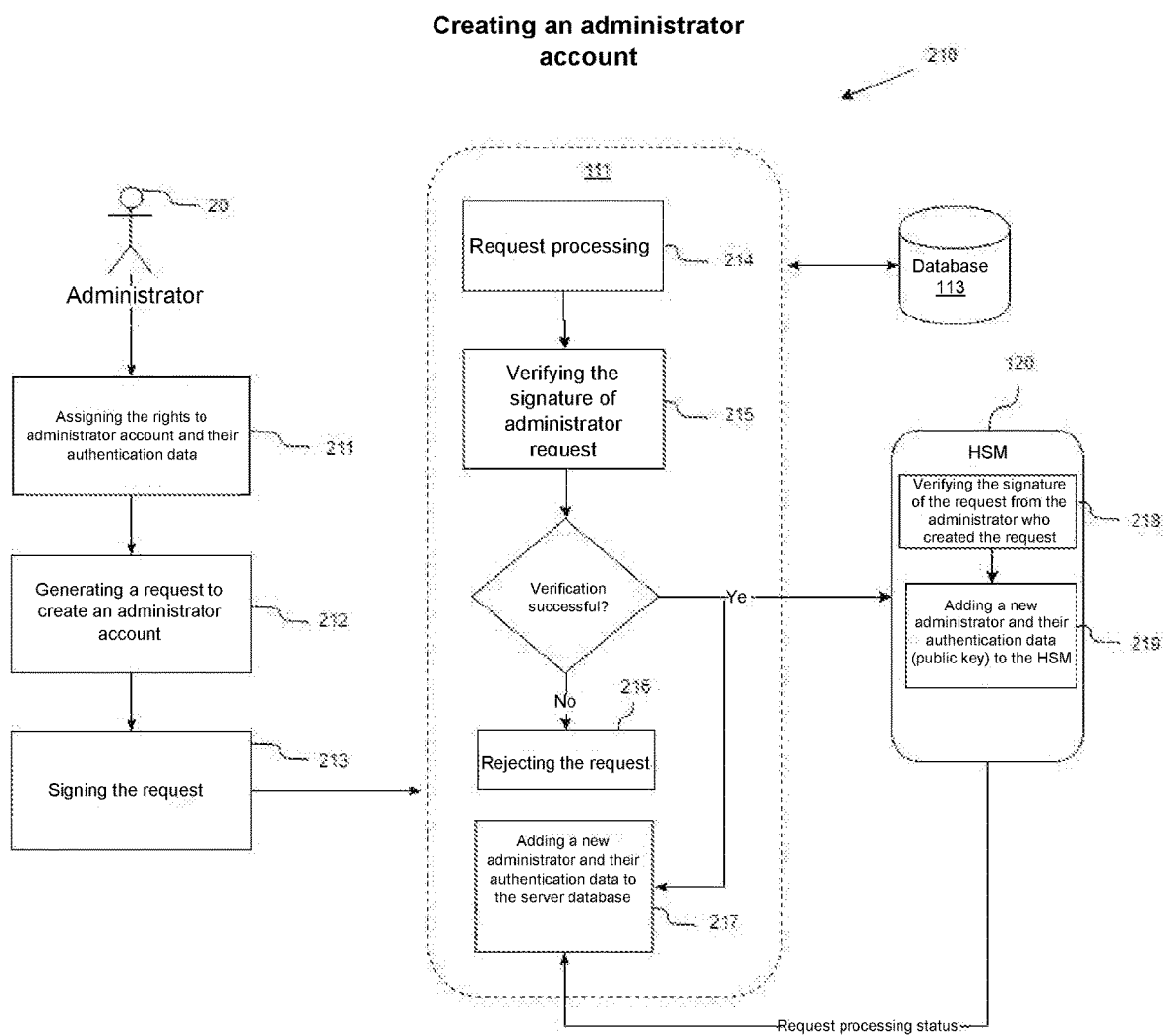
Figure 2B:
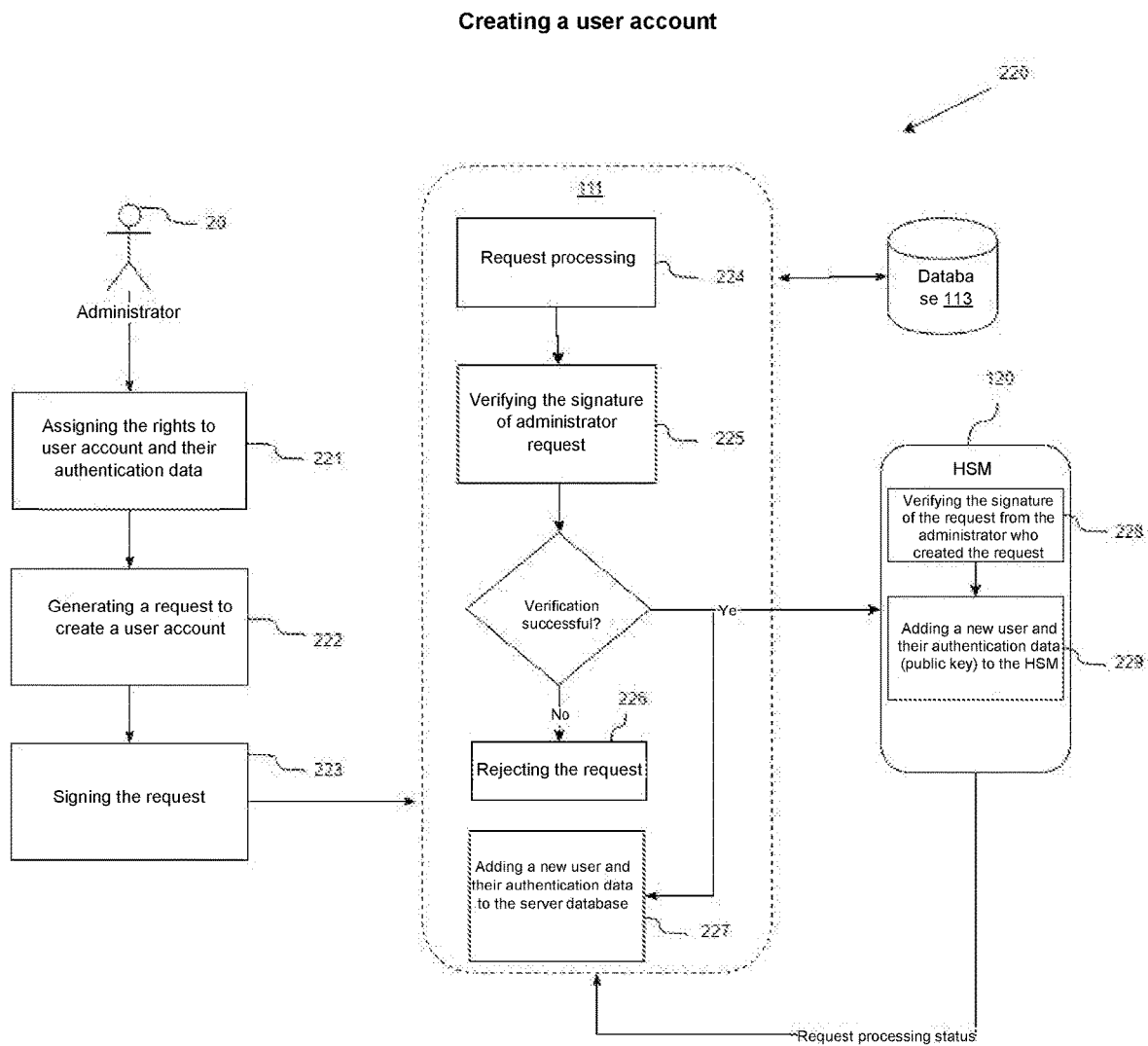
Figure 3A:
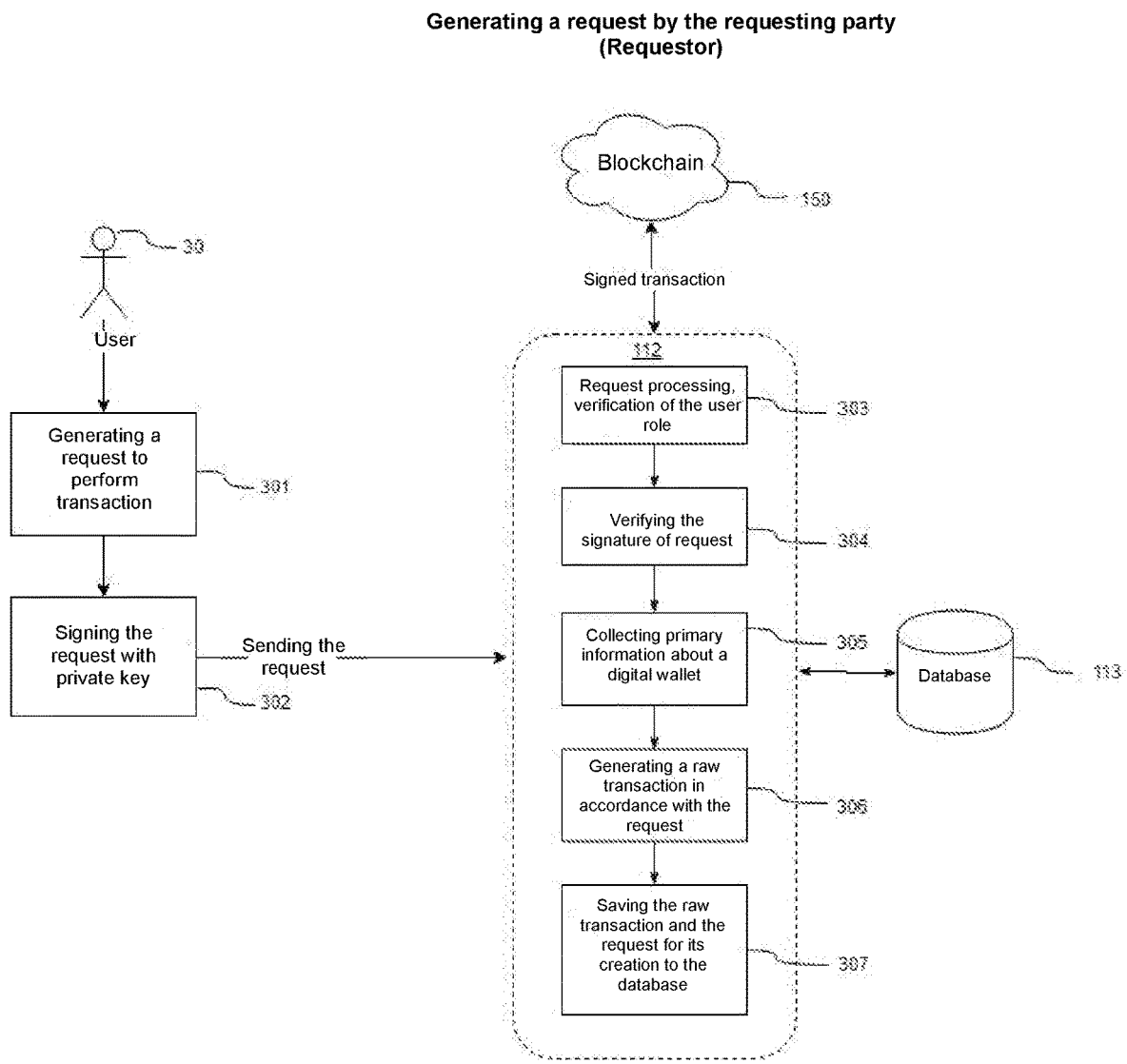
Figure 3B:
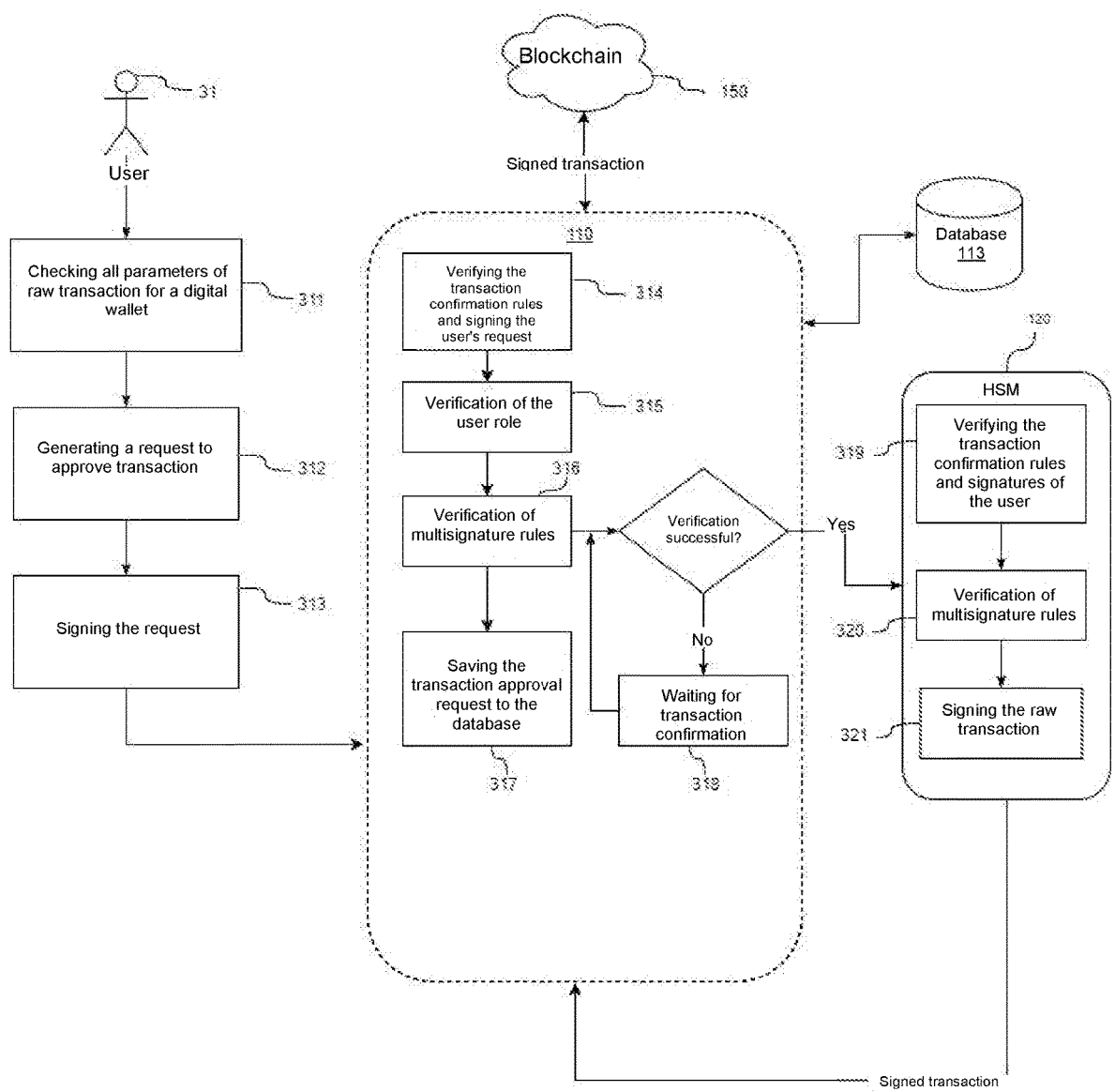
Figure 3C:
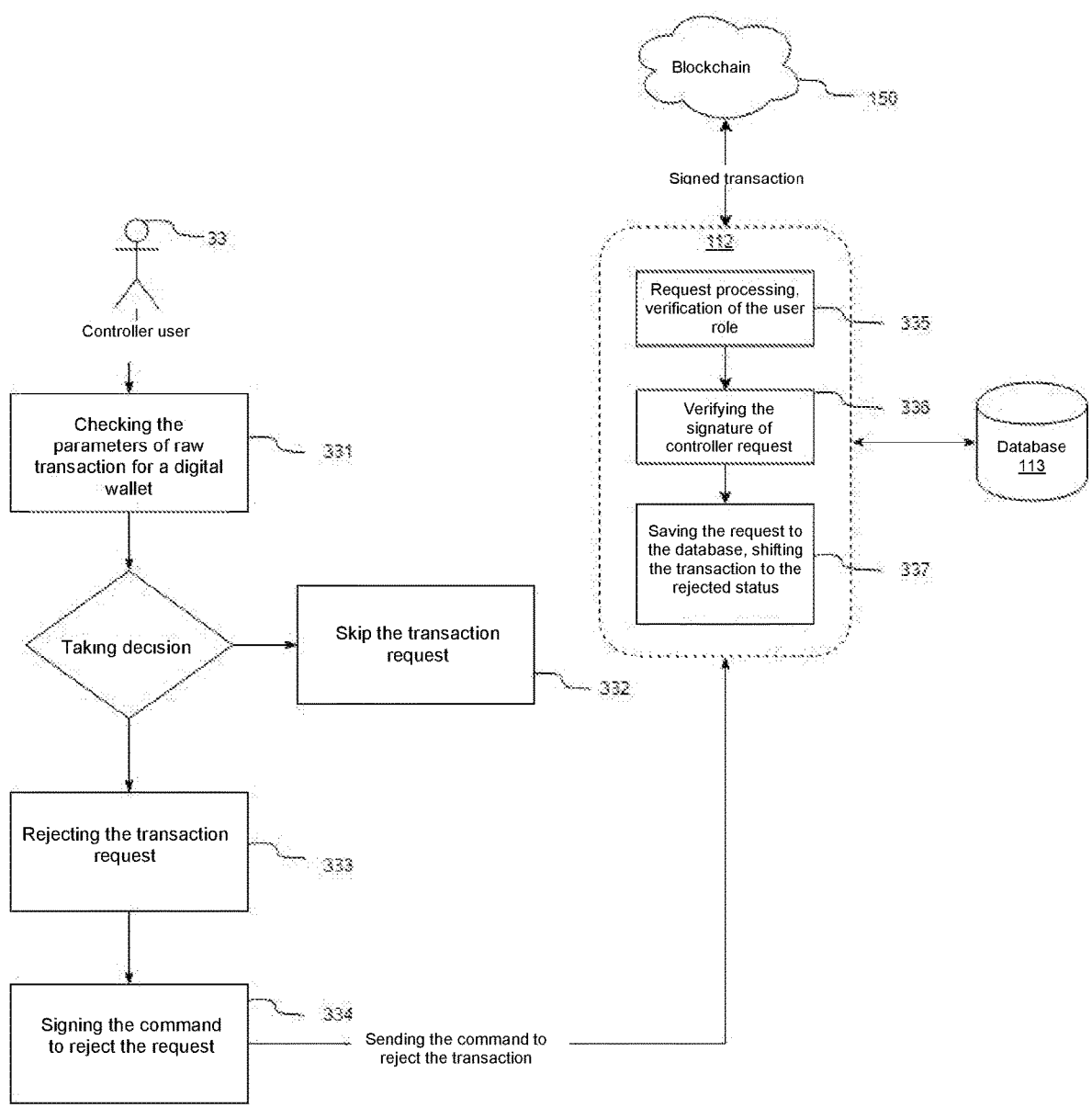
Figure 4:
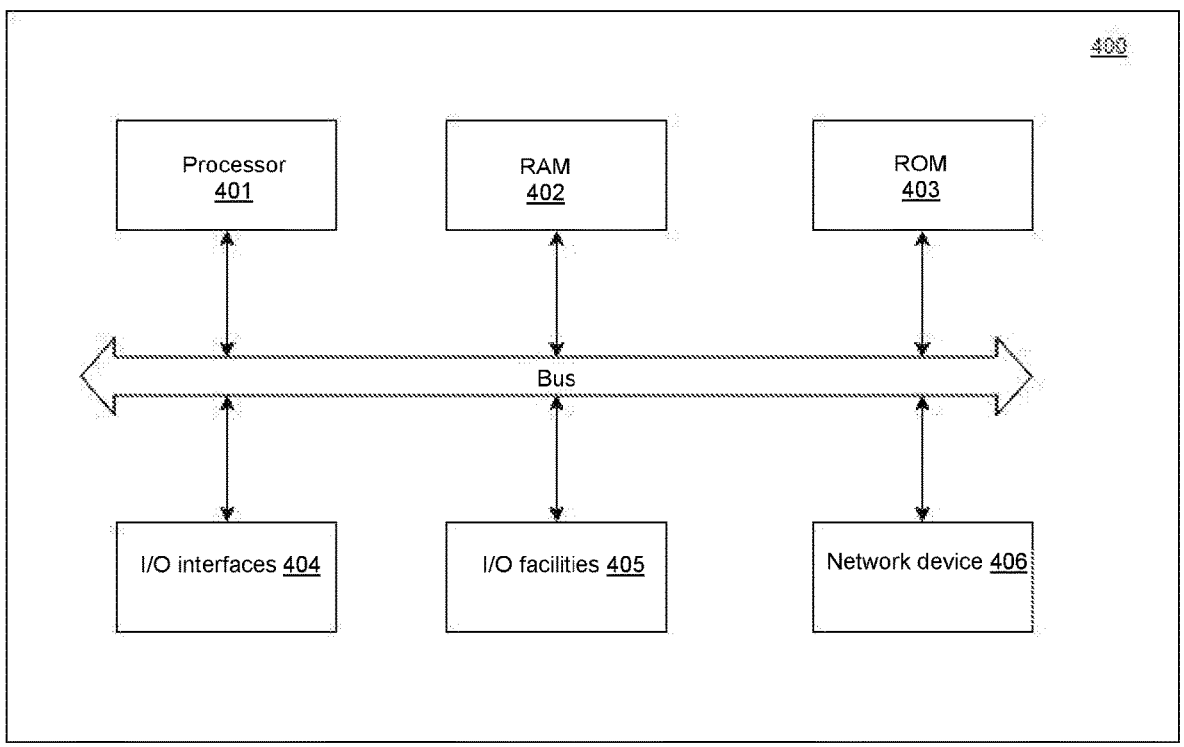

FIG. 1 shows a general view of the system.
FIG. 2A shows a flowchart of creating an administrator account.
FIG. 2B shows a flowchart of creating a user account.
FIG. 2 C shows a flowchart of creating a digital wallet.
FIG. 3A shows a flowchart of generating a transaction request.
FIG. 3B shows a flowchart of approving the transaction request.
FIG. 3C shows a flowchart of verifying the transaction request by controller user.
FIG. 4 shows a scheme of a computing device.

DETAILED DESCRIPTION OF THE INVENTION

As shown in FIG. 1, the claimed system (100) comprises a control server (110) that processes all incoming requests from users (10) and administrators (20), a hardware security module (HSM) (120), which is connected to the server and is also connected to one or more redundant HSMs (121)—(123).

The server (110) contains an administrator module (111), which enables to create accounts and manage the administrator rights, create accounts and manage the user (10) rights and provides the ability to obtain detailed information on digital wallets of users.

The server (110) also contains a user module (112) which enables to create digital wallets of users, assign the rules for multisignature of transactions and rules for their confirmation by users (10) for each created digital wallet. Module (112) also provides processing of user (10) requests, depending on the confirmation rules assigned at creation of a digital wallet, enabling users (10) to apply multifactor authentication methods.

The server (110) contains a database (113) that stores information about addresses of digital wallets, transactions, accounts of administrators and users (10), their rights and authentication data, multisignature and transaction validation rules. This information is further used in the process of performing transactions. The database (113) also stores authentication data (public keys) of users (10) and administrators (20) and logs of user actions. High requirements for fault tolerance and data replication are applied to the database. The database (113) can also be configured with replication function and contain multiple associated backup storage media. Modules (111) and (112) are configured as application programming interfaces (API) that provide interaction with user interfaces and integration with other software systems. Each API interacts with the corresponding web interface: administrator panel and client panel, which may be implemented on computing devices on the administrator and the client side, respectively.

A user module (112) may be represented by a separate secure web portal where users (10) can track the analytics and transaction history on their digital wallets, as well as propose and sign transactions depending on the role held by this user. The system assumes three types of roles: requesting party (Requestor—a user/group of users who can propose transactions for withdrawal), approving party (Approver—a user/group of users who must approve a transaction to make it become valid and signed) and controllers (Controller—a user/group of users who have right to reject a transaction within a certain time after the transaction was created by the Requestor).

An administrator module (111) may be a separate secure web portal where administrators (20) can observe a list of users (10) and their digital wallets, observe the analytics on digital wallets, including current balances, history of transactions of a user and all requests for input/withdrawal of digital assets.

Administrators (20) may approve withdrawal requests in those cases when signing by the bank representatives is required. Administrators (20) may also set limits on withdrawal of digital assets for each specific user (10), so that any transaction exceeding this limit will require manual verification and approval from the bank manager. Similarly for deposits, the administrator (20) can manage a trusted list of addresses (white list), deposits from which are automatically credited to the balance of the user (10). If the deposit came from an unknown address, then validation by the manager is required for its crediting. Similarly, administrators (20) can set the limit of allowable deposit so that in the event of receipt of abnormally large deposit to the user's wallet (10), they can request the corresponding proof of source of funds from them before the funds are credited to their account.

When creating a digital wallet via user module (112) it is possible to set user (10) roles (Requestor—a user/group of users who can propose transactions for withdrawal; Approver—a user group of users who must approve the transaction to make it become valid and signed; Controller—a user/group of users who have the right to reject the transaction within a certain time after the transaction was created by the requester), transaction multisignature rules (transaction signing mechanics), and transaction confirmation method.

The following approaches can be used as the transaction multisignature rules: M of N signatures, signature from K groups of users with a quorum within at least L groups.

As the methods for transaction confirmation it is possible to use, for example, following a hyperlink, entering a code, entering a one-time password, biometric identification, confirmation using a hardware token or a cryptographic signature. A smart card, USB or NFC token, etc. may be used as a hardware token.

The administrator module (111) also provides preparation of a trusted list of addresses (white list) for withdrawal of digital assets, control of procedures for restoring access of users (10) in case of loss of login credentials or loss of a hardware token, for example, a smart card.

Using the administrator panel, the manager can also register new users (10), restrict access of users (10) to account and switch users (10) to read-only mode prohibiting any actions with transactions on their digital wallets.

The control server (110) is also connected to the blockchain network (150), through which the transactions are performed in various blockchain networks.

HSM (120) is a physical computing device that enables to generate, store and control the digital keys. The module can be used in any application that uses digital keys. Since all cryptographic operations are performed directly by the module (120) itself, this allows to organize an additional security circuit when performing transactions and checking cryptographic keys in an isolated environment. HSM (120) is isolated from the public Internet, which makes it possible to secure the process of checking the necessary information prior to performing the transaction itself in the blockchain network (150) and eliminates the risk of any data leakage. One or more well-known solutions from such manufacturers as: Securosys SA, Gemalto, Utimaco, Demos, etc. can be used as HSM (120) (Hardware Security Module).

HSM (120) may be implemented with real-time data replication function, which is performed using one or more redundant HSMs, which makes it possible to increase the safety of information and the overall fault tolerance of the system.

HSM (120) provides an isolated secure environment for generation and storage of digital wallet addresses and private keys, as well as for signing of the approved fund withdrawal transactions. HSM (120) stores the authentication information, including public keys of all users (10). Another feature of HSM (120) is the provision of random generation of private keys with very high entropy.

The general principle of operation of the claimed system (100) consists in multi-factor confirmation of transactions prior to their transmission to blockchain (150). The server (110) receives and validates user (10) requests to create digital wallets, as well as stores the information about digital wallets of users (10), and when creating digital wallets for each of them the transaction multi-signature rules and the rules for their confirmation by users (10) are specified.

The control server (110) processes incoming requests for creation of digital wallets by users (10), verifies the signatures of requests by the authentication data of users and generates raw (primary) transactions, which are subsequently transmitted to the HSM (120) for further confirmation.

HSM (120) performs additional verification of the signatures of all requests for signing the raw transaction with the private key of the corresponding digital wallet and sends the signed transaction to the control server (110) for further transmission to the blockchain network (150). If verification of the transaction confirmation rules and user signatures (319) and verification of multisignature conditions (320) at the HSM (120) is successful, then the HSM (120) performs the procedure of signing the received raw transaction and transmits the signed transaction back to the server (110), which subsequently transfers the signed transaction to the blockchain network (150) for settlement.

HSM (120) provides secure storage of private keys of digital wallets, which are created on the HSM (120) on the basis of the confirmed request received from the control server (110). HSM (120) stores the authentication data of administrators and users for validation of transactions and requests for creation of wallets.

FIG. 2A shows the process of creation of administrator account (210) on the control server (110) using an administrator module (111). The administrator account (210) is created based on the creation of the primary control command generated by the module (111). Registration with the corresponding rights of a person who will be granted administrator (20) rights may act as such control command. When creating a control command for creation of an administrator account (210) on the control server (110), its authentication data (for example, login/password, public key) and a set of rights (211) are specified. Such rules may include setting of limits for withdrawal of digital assets from digital wallets and approval of incoming transactions.

Based on the generated command (211), a request (213) is generated to create an administrator account (212), which is signed using administrator's hardware token, for example, a smart card that contains a private cryptographic key. The signed request (213) is transmitted to the server (110) to the administrator module (111).

When the signed request (213) to create an administrator account (210) is received on the server (110), then it undergoes verification (214). During verification (214) the administrator signature which was used to sign the request (213) is verified (215). If verification fails, then the request to create an administrator account (210) is denied (216).

If verification of the signature (215) of the request is successful, then the request (213) is transmitted to the HSM (120) for further verification. At the HSM (120) the signature of the request is verified (218), particularly, the administrator's private key, by which the request (213) was signed. After successful verification of the signature of the request at the HSM (120), a public key (219) is generated for this request, which is saved in the HSM database (120) for the corresponding authentication data of the administrator. Further, the information about the created account, its data and the generated public key are transferred (217) to the server (113) database. FIG. 2B shows the process of creating a user account (220). Account (220) is created by the administrator (20) using the administrator module (111).

When creating a user account (220), the authentication data of this user are specified and a set of rights assigned to this account is determined (221). Based on this information, a request for creating an account (222) is generated, which is signed using the administrator's private key (223) stored on a hardware token, for example, a USB token or a smart card.

The signed request to create a user account (223) is sent to the server (110) for further processing. During verification (224), the server (110) verifies (225) the signature of the user by which the request was signed (223). If verification fails, then the request to create a user account (10) is denied (226).

If verification (225) of the signature of the request is successful, then the request (223) is transmitted to the HSM (120) for further verification. At the HSM (120), the signature of the request is verified (228) for compliance with the saved authentication data. After successful verification of the signature of the request at the HSM (120) a new user is created and the authentication data (public key) (229) of this user is saved. Further, the information about the created account (220) and the authentication data are transmitted to the control server (227) where they are saved in the database (113).

When creating a digital wallet, the user module (112) is used to assign user account roles (10). In particular, the user (10) can be assigned as responsible for confirmation and control of transactions on this wallet, as well as on one or more other digital wallets. The role of the user account may vary for different digital wallets.

Figure 2C:
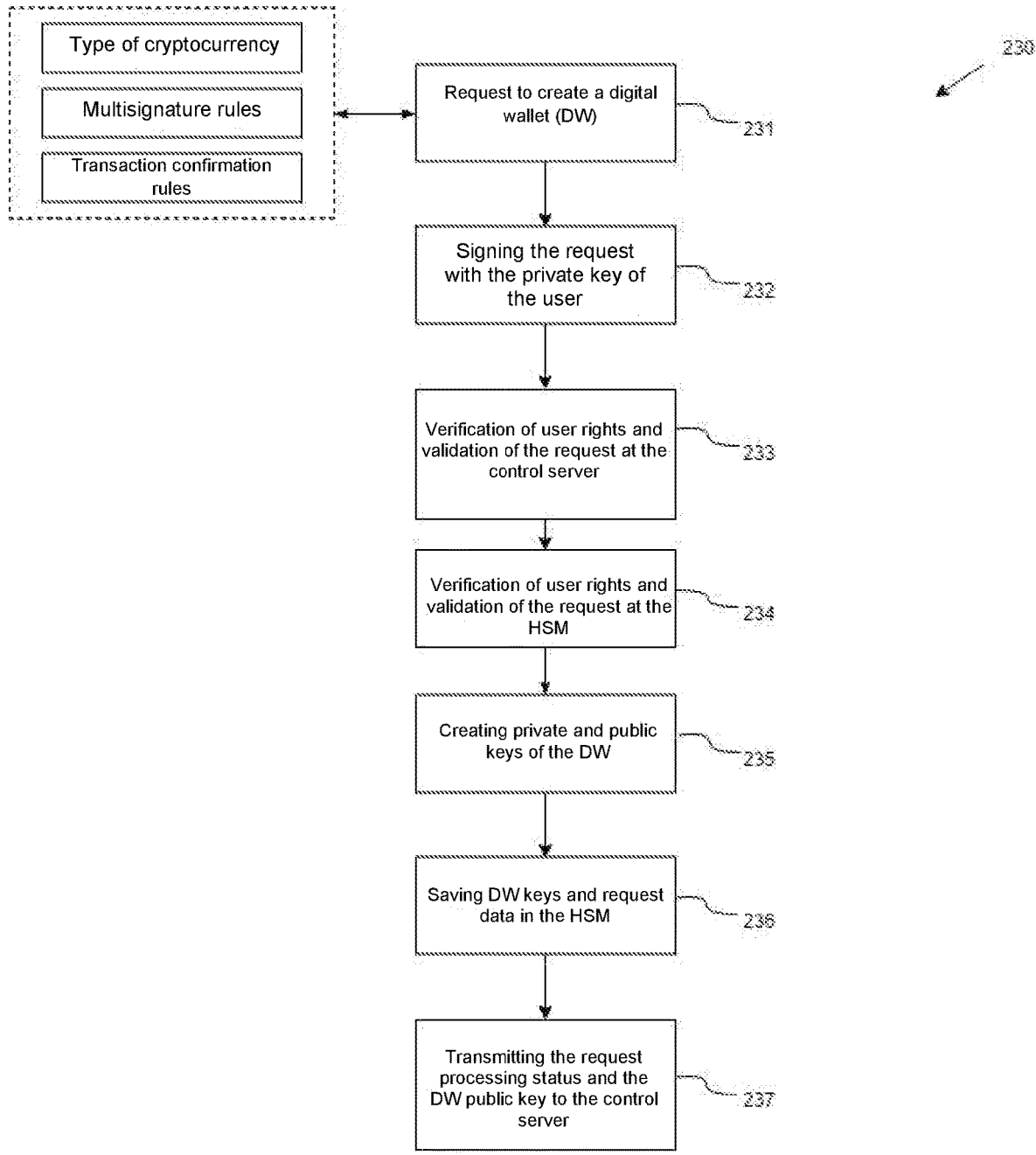

FIG. 2C shows a procedure (230) of creating a digital wallet for performing transactions with digital assets, in particular, with cryptocurrency. At the first stage (231) a request to create a digital wallet is received from user (10). The request (231) includes the type of cryptocurrency, multisignature rules and transaction confirmation rules, and it is generated by means of a user module (112).

The request (231) to create a digital wallet is signed with the user's private key (232) stored on the user's hardware token. The signed request is sent to the server (110) for further validation (233).

The validation process (233) consists in processing the authentication data of the user account (220), particularly, verification of signature of the request (231) for compliance with the authentication data, particularly, with the public key stored in the server database (113). Also, in the verification process (233), the rights of the user (10) are checked.

After successful validation of the request on the control server (110), the user request is transmitted to the HSM (120), where the validation process (234) is also performed, during which the signature of the request (232) is verified for compliance with the public key stored in the HSM (120).

Based on the results of validation (234) of the request at the HSM a public/private key pair (235) is generated for the new digital wallet. In addition, the parameters for created wallets and transaction multisignature and confirmation rules for these wallets (236) are saved at the HSM (120). After processing the request for creation of digital wallet, the information about successful status of the procedure (230) of creating the digital wallet and its public key are transmitted to the server (237).

The following approaches can be used as the transaction multisignature rules: M of N signatures, signature from K groups of users with a quorum within at least L groups.

As the methods for transaction confirmation it is possible to use, for example, following a hyperlink, entering a code, entering a one-time password, biometric identification, confirmation using a hardware token or a cryptographic signature, double authentication, etc. A smart card, USB or NFC token, etc. may be used as a hardware token.

Digital wallet may be used for various types of cryptocurrencies, for example, BTC, BCH, ETH, ETC, ERC20, ERC223, LTC, etc.

FIG. 3A and FIG. 3B show the process of making transactions by means of the digital wallets of users. As shown in FIG. 3A, a request for completion of a transaction is made by the Requestor (301). The generated request (301) is signed by the user's private key (302) and sent to the server (110) for further processing. The transaction request (301) is usually received from the user (30) to whom the role of requesting party (Requestor) was assigned at registration.

After receiving the signed request (302) the server (110) performs the transaction validation process to check whether all the conditions specified when creating the wallet of the user (30), who requests for making the transaction, are met. The server (110) checks the role (303) of the user (30) requesting the execution of the transaction. Further, the signature of the transaction request is verified (304) for compliance with the authentication data, particularly, with the user's public key which is stored in the server database (113). If verification is unsuccessful the transaction request is rejected and a corresponding notification is sent to the user (30).

After successful verification at step (304) the primary data of the digital wallet in the blockchain network (305) is collected on the server (110). Such information may include, for example, balance of the digital wallet, history of transactions, etc. Then, at step (306) on the basis of the primary data obtained at step (305) a raw transaction is generated and this transaction is saved (307) on the control server (110).

FIG. 3B shows the process of verification of transaction created at step (307) by the approving party (Approver) (31). In the first step (311) the user verifies all parameters of the transaction for the digital wallet, such as an amount of transaction, recipient address, etc. If verification is completed successfully, then a request for approval of the transaction (312) is generated which is signed (313) with the private key of the Approver (31). The signed request (313) is sent to the server (110).

The server (110) verifies (314) the specified transaction confirmation rules, as well as the signature of the party (31) which signed the request (313). Then, it verifies (315) the specified role of the user (31) and checks (316) whether the multisignature conditions are met, i.e. that the transaction request was signed by all authorized users.

If verification at step (316) was successful, then the control server (110) transfers the raw transaction and the signed requests of users, who approved the transaction, to the HSM (120). Also, the request for approval of the transaction is recorded (317) in the server database (113). If the multisignature condition for the raw transaction is not met, the transaction is expected to be signed by all authorized users within the specified time period. If the transaction is not signed within the specified time, the transaction request is rejected.

According to the data received from the server (110) the HSM (120) verifies (319) the rules for confirmation of the transaction by each signer and the conditions for multisigning (320) of the received raw transaction. If verification is successful, the HSM program logic (120) is used to sign (321) the raw transaction with the private key of the digital wallet by which the transaction approval request (313) was initiated.

The signed transaction is transmitted from the HSM (120) to the control server (110) from which it is then transmitted to the blockchain network (150).

FIG. 3C shows the process of verifying the transaction by means of the user account (33) to which the role of controller was assigned. Based on the information received about the generated raw transaction, the user (33) verifies its parameters, such as the amount of transaction, recipient address, and so on.

Based on the results of verification the user (33) decides whether to approve (332) the transaction request or reject (333) this request. If the transaction request is rejected (333), the user (33) signs the request for rejection of the transaction using their private key (334) and transmits the signed request to the server (110). The user module (112) is used on the server (110) to verify (335) the user role (33) for rejecting transaction requests, as well as to verify (336) the signature which was used to sign the corresponding request for rejection of the transaction. After verification the server (110) stores the status (337) of the completed request for rejection of the transaction, and the transaction is shifted to rejected status.

User account enables to initiate, approve and reject transactions, veto transactions within a certain period of time after the transaction was proposed, as well as to create digital wallets if such role privileges were set by the administrator module (111).

Transaction multisignature rules include, for example, M of N signatures, a signature from multiple groups, or a signature from multiple groups with a quorum within a group, as well as setting a time period for transaction confirmation after which the transaction is rejected.

For each signature the weight coefficient and threshold value may be set for each of the groups of users assigned to this digital wallet to confirm the transaction. The threshold value must be exceeded by the sum of the weights of all signers in the group in order to perform the transaction confirmation procedure. At that, for each initiated transaction a time period may be set within which the transaction can be vetoed.

FIG. 4 shows an embodiment of a computing device (400) on the basis of which, for example, a server (110) or other devices may be implemented, which make it possible to interact with the claimed system and perform transactions with digital assets.

Generally, device (400) may be chosen from a wide range of electronic devices known in the art, for example, personal computers, laptops, tablets, supercomputers, server clusters, smartphones, and the like. Device (400) may contain one or more processors (401) or one or more microcontrollers, RAM (402), persistent data storage facility (403), input/output interfaces (404), input/output devices (405), networking facility (406).

Processor (401) is the main computing module that provides logical processing of algorithmic commands necessary for the device (400) to perform the necessary functions. RAM (402) is a standard random access memory that is used to store the instructions executed on the processor to perform operation of the embedded program logic.

Persistent data storage facilities (403) may include, but not limited to: hard disk drive (HDD), flash-memory (NAND, EEPROM, SD-cards, etc.), solid-state drive (SSD), optical disk storage (CD/DVD/BlueRay disks, etc.).

I/O interfaces (404) may include, but not limited to: ADC/DAC, USB (micro-, Type C, mini-, etc.), PS/2, PCI, VGA, RS232, RJ45, FireWire, SATA, IDE, COM, LPT, Audio Jack, HDMI, Display Port, Lightning, etc.

I/O facilities (405) may include, but not limited to: display, touch screen, keyboard (mechanical, touch-sensitive, projection, etc.), trackball, joystick, touch pad, speakers, microphone, projector, indicator lamp, buzzer, biometric sensor (fingerprint, retina, iris, voice, palm, vein pattern scanners and the like), camera, optical sensor, accelerometer, gyroscope, light sensor, proximity sensor, gravisensor, etc.

Networking facility (406) may include, but not limited to: Bluetooth module, BLE module, NFC, Ethernet card, modem, router, IrDa, GSM modem, GPRS modem, LTE modem, 5G modem, WLAN, Wi-Fi module, satellite modem, GNSS receiver, etc.

The given description of the claimed solution identifies only the preferred embodiments and shall not be construed as limiting other, specific embodiments within the scope of the claimed legal protection that shall be familiar to a person skilled in the art.

The invention claimed is:

1. A system for secure storage of digital currencies, processing and executing transactions in at least one blockchain network, wherein system contains
    a server connected to at least one blockchain network and the server providing a life-cycle management of a digital wallets of users, tracking and validation of an incoming transactions, generation and primary validation of the transactions in the at least one blockchain network, wherein the server contains
    an administrator module, which is configured to create an accounts for administrators and users, manage an administrator rights which allow to set limits for withdrawal of the digital currencies from digital wallets and approve an incoming transactions, and users rights, which allow to set a transaction multisignature rules and a transaction confirmation rules, view statistics on the digital wallets of users;
    a user module, which is configured to
        create the digital wallets of users, assign the multisignature rules for transactions and the transaction confirmation rules by users for each created digital wallet, wherein
            the transaction multisignature rules include one of the following: M of N signatures, a signature from multiple groups, or a signature from multiple groups with a quorum within a group, or transaction confirmation time period after which the transaction is rejected;
            the confirmation rules include at least of the following: a hyperlink, a code, a one-time password, a biometric identification, a confirmation step using a hardware token or a cryptographic signature;
        process a user requests depending on the confirmation rules assigned to the digital wallet;
        assign a multi-factor authentication methods by users;
    a database, that stores an information about addresses of digital wallets, transactions, an administrators and users accounts, rights of administrators and users, an authentication data, the transaction multisignature rules and transaction confirmation rules for created digital wallets;
    at least one hardware security module (HSM), which is connected to the server, wherein HSM provides
        an isolated environment to create and maintain the full life-cycle management of the digital wallets;
        a secure storage of private keys of the digital wallets;
        a storage of the authentication data of administrators and users;
        supporting a process of sending addresses of digital wallets to the server;
        validation of transactions, signing of a confirmed transactions;
        transfer confirmed transactions to the server.

2. The system according to claim 1, wherein the multisignature rules are set at creating process of the digital wallet of user.

3. The system according to claim 1, wherein the hardware token is a smart card, USB, or NFC token.

4. The system according to claim 1, wherein when processing the transaction for the digital wallet the server performs an initial verification for compliance with the multisignature and confirmation rules for the digital wallet to approve the transaction.

5. The system according to claim 4, wherein upon receipt of a request for the transaction via the digital wallet, the server, using the authentication data, performs the initial verification of signatures of all users assigned in the multisignature rules for the digital wallet.

6. The system according to claim 5, wherein after validation of the request for transaction the server collects a primary information about the digital wallet in the blockchain network and generates a raw transaction on its basis, which is saved in the database.

7. The system according to claim 1, wherein for each signature a weight coefficients and a threshold values are set for each of the groups, and the threshold value must be exceeded by the sum of the weights of all signers in the group to confirm the transaction.

8. The system according to claim 6, wherein after validation of the transaction and initial verification of all signatures, the control server transmits the transaction data and signatures to the HSM.

9. The system according to claim 8, wherein by the authentication data the HSM checks the incoming raw transactions from the server for the validity of the signatures that were used to confirm the transaction, and in case of successful verification, signs the raw transactions using the private key of the digital wallet corresponding to this transaction.

10. The system according to claim 9, wherein after signing of the raw transaction the HSM transfers the signed transaction to the server for its subsequent transfer to the blockchain network.

11. A transaction execution method using a digital currency in a blockchain network, comprising the following steps:
    receiving a request on a server to create a digital wallet to make a transactions using digital currency, wherein server comprises an administrator module, which is configured to create an accounts for administrators and users, manage an administrator rights which allow to set limits for withdrawal of the digital currencies from digital wallets and approve an incoming transactions, and users rights, which allow to set a transaction multisignature rules and a transaction confirmation rules, view statistics on the digital wallets of users; the request comprises the transaction multisignature rules and the transaction confirmation rules, which is created by users for the digital wallet, wherein
        the multisignature rules include an authentication data of users assigned to sign the transactions and at least one of the following: M of N signatures, a signature from multiple groups, or a signature from multiple groups with a quorum within a group, or transaction confirmation time period after which the transaction is rejected;
        the transaction confirmation rules include at least of the following: a hyperlink, a code, an one-time password, a biometric identification, a confirmation step using a hardware token or a cryptographic signature;
    verifying users rights and the multisignature rules of the request for creation of the digital wallet using the authentication data of users;
    signing the request for creation of the digital wallet;

transferring the request for creation of the digital wallet to a hardware security module (HSM), wherein user's digital wallet is created by generating a private and public keys of the digital wallet at the HSM and the private and public keys of the digital wallet and the authentication data of users assigned to sign transactions on the created digital wallet are saved in the HSM;

transmitting and save the public key of the created digital wallet and the authentication data of users assigned to sign transactions on the created digital wallet in a database of the server;

receiving a request on the server to execute a transaction by one of the created digital wallets;

collecting on the server a primary data of the digital wallet in the blockchain network;

generating and saving on the server a raw transaction based on the primary data;

confirming the raw transaction by all users using the transaction multisignature rules and transaction confirmation rules for the digital wallet;

checking a confirmation of the transaction by the server, the raw transaction and signatures of the users confirming the transaction;

transmitting confirmed transaction to the HSM;

verifying the transaction confirmation rules by each user signed the confirmed transaction, wherein the multisignature rules of the raw transaction are verified on the HSM by the authentication data, and whether verification is successful the raw transaction is signed using the private key of the digital wallet whereby the transaction was initiated;

transferring the signed transaction to the server for its further transfer to the blockchain network.

12. The method according to claim 11, wherein the user account enables at least one of the following: initiate transactions, approve and reject transactions, veto transactions for a specified period of time after the transaction has been proposed, create digital wallets.

13. The method according to claim 11, wherein for each signature a weight coefficients and threshold values are set for each of the groups, and the threshold value must be exceeded by the sum of the weights of all signers in the group to confirm the transaction.

14. The method according to claim 11, wherein for each initiated transaction a time period is set within which the transaction can be vetoed.

15. The method according to claim 11, wherein the HSM is implemented with a real-time data replication function, which is performed using one or more redundant HSMs.

* * * * *